US010871582B2

(12) United States Patent
Li et al.

(10) Patent No.: US 10,871,582 B2
(45) Date of Patent: Dec. 22, 2020

(54) DETECTION PANEL, MANUFACTURING METHOD THEREOF AND DETECTION DEVICE

(71) Applicants: Beijing BOE Optoelectronics Technology Co., Ltd., Beijing (CN); BOE Technology Group Co., Ltd., Beijing (CN)

(72) Inventors: Jing Li, Beijing (CN); Wenyu Zhang, Beijing (CN); Liangjie Li, Beijing (CN); Hao Dong, Beijing (CN); Da Xu, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/398,935

(22) Filed: Apr. 30, 2019

(65) Prior Publication Data

US 2020/0081139 A1 Mar. 12, 2020

(30) Foreign Application Priority Data

Sep. 11, 2018 (CN) .......................... 2018 1 1056629

(51) Int. Cl.
*G01T 1/20* (2006.01)
*G02F 1/1685* (2019.01)
(Continued)

(52) U.S. Cl.
CPC .......... *G01T 1/2018* (2013.01); *G01T 1/2002* (2013.01); *G02F 1/1368* (2013.01);
(Continued)

(58) Field of Classification Search
CPC ....... G01T 1/2018; G01T 1/2002; G01T 7/00; G02F 1/1685; G02F 1/16757;
(Continued)

(56) References Cited

U.S. PATENT DOCUMENTS

| 8,432,467 | B2 * | 4/2013 | Jaworski | ................ | G09G 3/001 |
| | | | | | 348/294 |
| 2015/0060675 | A1 * | 3/2015 | Akimoto | ................ | G01T 1/2018 |
| | | | | | 250/361 R |
| 2016/0013238 | A1 * | 1/2016 | Boukhayma | ...... | H01L 27/14601 |
| | | | | | 257/292 |

FOREIGN PATENT DOCUMENTS

| TW | 293225 B | 12/1996 |
| WO | 2016025731 A1 | 2/2016 |

OTHER PUBLICATIONS

Office Action corresponding to Chinese Application No. 201811056629.2 dated Mar. 20, 2020.

* cited by examiner

*Primary Examiner* — Kiho Kim
(74) *Attorney, Agent, or Firm* — Arent Fox LLP; Michael Fainberg

(57) ABSTRACT

The present disclosure relates to a detection panel, a manufacturing method thereof and a detection device. The detection panel comprises: a base substrate and a photoelectric conversion structure located on the base substrate, and a display structure located on a side of the photoelectric conversion structure facing away from the base substrate and electrically connected to the photoelectric conversion structure; wherein the photoelectric conversion structure is configured to convert an optical signal into an electrical signal, and the display structure is configured to perform image display according to the electrical signal.

13 Claims, 10 Drawing Sheets

(51) Int. Cl.
*G02F 1/16757* (2019.01)
*G02F 1/16766* (2019.01)
*G02F 1/1368* (2006.01)
*G02F 1/167* (2019.01)

(52) U.S. Cl.
CPC ............ *G02F 1/167* (2013.01); *G02F 1/1685* (2019.01); *G02F 1/16757* (2019.01); *G02F 1/16766* (2019.01)

(58) Field of Classification Search
CPC .... G02F 1/16766; G02F 1/1368; G02F 1/167; H01L 27/14612; H01L 27/14643; H01L 27/14683
See application file for complete search history.

DETECTION PANEL, MANUFACTURING METHOD THEREOF AND DETECTION DEVICE

CROSS-REFERENCE TO RELATED APPLICATION

This application claims priority of Chinese Patent Application No. 201811056629.2, filed on Sep. 11, 2018, which is hereby incorporated by reference in its entirety.

FIELD

The present disclosure relates to the technical field of detection panels, and in particular, to a detection panel, a manufacturing method thereof and a detection device.

BACKGROUND

Sensors manufactured based on Thin Film Transistor (TFT) technology are critical components in digital imaging technology, and are widely used in medical imaging (such as chest X-ray), industrial testing (such as metal flaw detection), security testing, air transportation and other fields due to their fast imaging speed, good spatial and density resolution, high signal-to-noise ratio, direct digital output and other advantages.

SUMMARY

Some embodiments of the present disclosure provide a detection panel, including: a base substrate and a photoelectric conversion structure located on the base substrate, and a display structure located on a side of the photoelectric conversion structure facing away from the base substrate and electrically connected to the photoelectric conversion structure; wherein the photoelectric conversion structure is configured to convert an optical signal into an electrical signal, and the display structure is configured to perform image display according to the electrical signal.

In a possible implementation manner, in the detection panel provided by some embodiments of the present disclosure, the photoelectric conversion structure includes a first electrode, a photodiode and a second electrode which are sequentially stacked on the base substrate, wherein the second electrode is electrically connected to the display structure.

In a possible implementation manner, in the detection panel provided by some embodiments of the present disclosure, the display structure includes a third electrode and an electronic ink layer which are sequentially stacked on the photoelectric conversion structure; wherein the third electrode and the second electrode are integrated.

In a possible implementation manner, in the detection panel provided by some embodiments of the present disclosure, an orthographic projection of the electronic ink layer on the base substrate at least partially covers an orthographic projection of the photoelectric conversion structure on the base substrate.

In a possible implementation manner, in the detection panel provided by some embodiments of the present disclosure, the electronic ink layer includes microcapsules in which black particles and white particles with opposite charge polarities are present.

In a possible implementation manner, the detection panel provided by some embodiments of the present disclosure further includes a thin film transistor, wherein the thin film transistor includes a gate, an active layer, a source and a drain, and the second electrode and the drain are integrated.

In a possible implementation manner, the detection panel provided by some embodiments of the present disclosure further includes a planarization layer that is located between the first electrode and the thin film transistor and has a via hole, wherein the photodiode is located in the via hole of the planarization layer, and the electronic ink layer is partially located in the via hole of the planarization layer; the source, the gate, the active and the gate is sequentially disposed on a side of the planarization layer facing away from the base substrate.

In a possible implementation manner, the detection panel provided by some embodiments of the present disclosure further includes a first electrode lead electrically connected to the first electrode, wherein the first electrode lead includes a light shielding portion, and an orthographic projection of the light shielding portion on the base substrate covers an orthographic projection of the active layer on the base substrate.

In a possible implementation manner, the detection panel provided by some embodiments of the present disclosure further including a second electrode lead electrically connected to the second electrode to an integrated circuit, wherein a gate of the thin film transistor is connected to a gate signal line, and a source of the thin film transistor is connected to the second electrode lead.

In a possible implementation manner, the detection panel provided by some embodiments of the present disclosure further includes a scintillation layer located on a side of the base substrate facing away from the display structure, wherein the scintillation layer is configured to convert a radiation signal into the optical signal.

Accordingly, some embodiments of the present disclosure further provide a detection device, including a detection panel according to any embodiment of the present disclosure, the detection device further including a radiation emitting source located on a side of the scintillation layer facing away from the base substrate.

Accordingly, some embodiments of the present disclosure further provide a manufacturing method of a detection panel, including:

forming a photoelectric conversion structure on an base substrate, wherein the photoelectric conversion structure is configured to convert an optical signal into an electrical signal; and forming a display structure electrically connected to the photoelectric conversion structure on the base substrate on which the photoelectric conversion structure is formed, wherein the display structure is configured to perform image display according to the electrical signal.

In a possible implementation manner, in the manufacturing method of a detection panel provided by some embodiments of the present disclosure, forming the photoelectric conversion structure optionally includes:

forming a first electrode on the base substrate;

forming a planarization layer that is located on a side of the first electrode facing away from the base substrate and has a via hole, wherein the via hole exposes the first electrode;

forming a photodiode in the via hole and on the side of the first electrode facing away from the base substrate; and forming, by a patterning process, a second electrode located in the via hole and on a side of the photodiode facing away from the base substrate, and a drain located on a side of the planarization layer facing away from the base substrate.

In a possible implementation manner, the manufacturing method of a detection panel provided by some embodiments of the present disclosure, after forming the second electrode, further includes:

forming an electronic ink layer partially located in the via hole and on a side of the second electrode facing away from the base substrate.

DETAILED DESCRIPTION OF THE EMBODIMENTS

Figure 1:
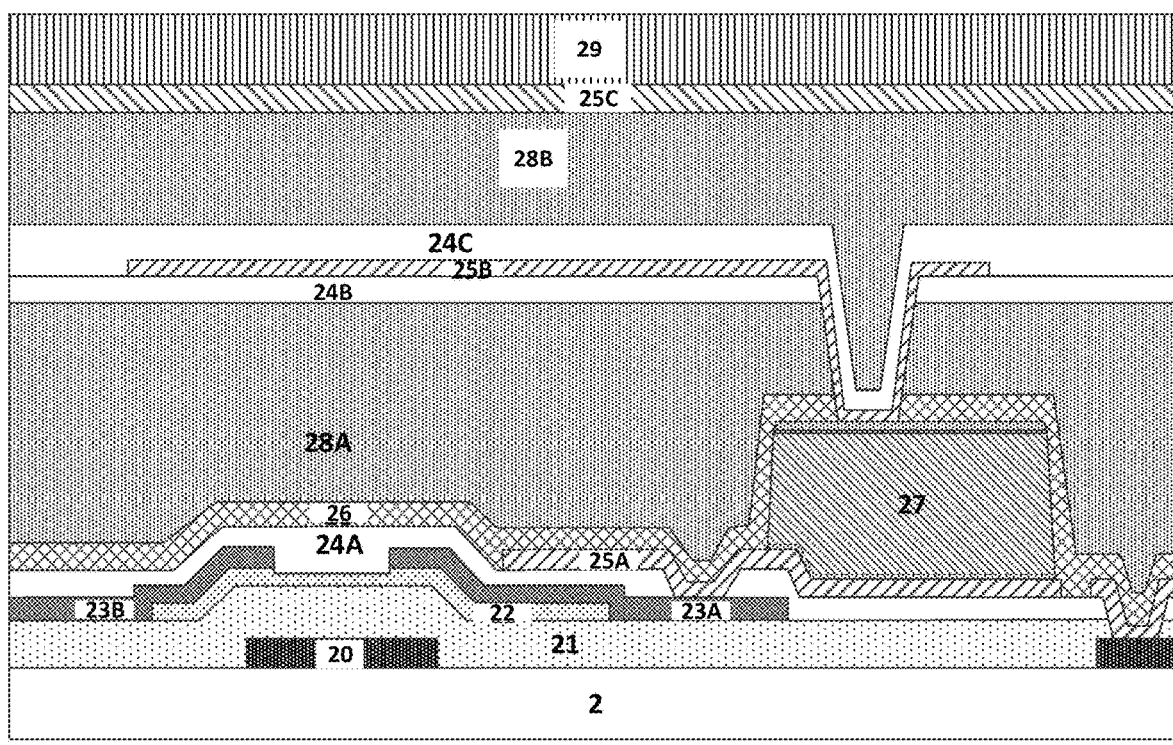
FIG. 1 is a schematic diagram of a detection panel in the related art.

In order to make the purpose, technical solution and advantages of the present disclosure clearer, a detection panel, a manufacturing method thereof and a detection device provided by the embodiments of the present disclosure will be described in detail below with reference to the drawings.

The thickness and shape of each layer of film in the drawings do not reflect the true scale of the detection panel for the only purpose of illustrating the contents of the present disclosure.

The structure of a detection panel in the related art is as shown in FIG. 1. The detection panel includes: a base substrate 2; a gate 20 on the base substrate 2; a gate insulator 21 on the gate 20; an active layer 22 on the gate insulator 21; a drain 23A, a source 23B and a data line (not shown in the figure) connected to the source 23B which are at the same layer on the active layer 22; a first passivation layer 24A on the drain 23A and the source 23B; a first ITO (Indium-Tin Oxide) layer 25A on the first passivation layer 24 A and electrically connected to the drain 23A; an insulator 26 on the first ITO layer 25A; a PIN photodiode 27 on the insulator 26; a first resin layer 28A on the PIN photodiode 27; a second passivation layer 24B on the first resin layer 28A; a second ITO layer 25B on the second passivation layer 24B and electrically connected to the PIN photodiode 27 through a via hole penetrating through the second passivation layer 24B and the resin layer 28; a third passivation layer 24C on the second ITO layer 25B; a second resin layer 28B on the third passivation layer 24C; a third ITO layer 25C on the second resin layer 28B; and a scintillation layer 29 on the third ITO layer 25C.

For example, under X-ray irradiation, X-rays are converted into the light (e.g., visible light) which can be recognized by the PIN photodiode 27, by the scintillation layer 29; the first ITO layer 25A is charged with a voltage of 1V by the TFT, and the second ITO layer 25B is charged with a voltage of −5 to −10V, so that the PIN photodiode 27 operates under a negative bias voltage; after illumination, the PIN photodiode 27 generates electrons, the voltage of the first ITO layer 25A becomes smaller (minimum to −5~−10V), and the TFT reads a change in the voltage of the first ITO layer 25A and displays as a different gradation. However, the above detection panel requires an external display device to display the picture, and cannot implement the synchronous display function.

Figure 2:
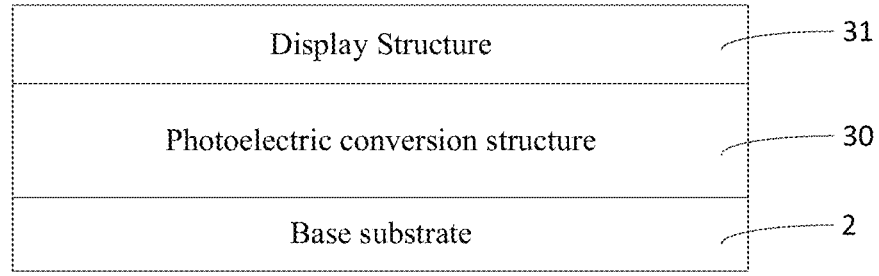
FIG. 2 is a schematic diagram of a detection panel provided in some embodiments of the present disclosure.

In view of this, some embodiments of the present disclosure provide a detection panel, as shown in FIG. 2, including: a base substrate 2 and a photoelectric conversion structure 30 located on the base substrate 2, and a display structure 31 located on a side of the photoelectric conversion structure 30 facing away from the base substrate 2 and electrically connected to the photoelectric conversion structure 30; wherein the photoelectric conversion structure 30 is configured to convert an optical signal into an electrical signal, and the display structure 31 is configured to perform image display according to the electrical signal.

A detection panel provided in some embodiments of the present disclosure includes: a base substrate and a photoelectric conversion structure located on the base substrate, and a display structure located on a side of the photoelectric conversion structure facing away from the base substrate and electrically connected to the photoelectric conversion structure; wherein the photoelectric conversion structure is configured to convert an optical signal into an electrical signal, and the display structure is configured to perform image display according to the electrical signal. In some embodiments of the present disclosure, the display structure electrically connected to the photoelectric conversion structure is disposed on the side of the photoelectric conversion structure facing away from the base substrate, and the direct display function of the detection panel is implemented by controlling the display structure, thus implementing the synchronous display function without requiring an external display device.

Figure 3:
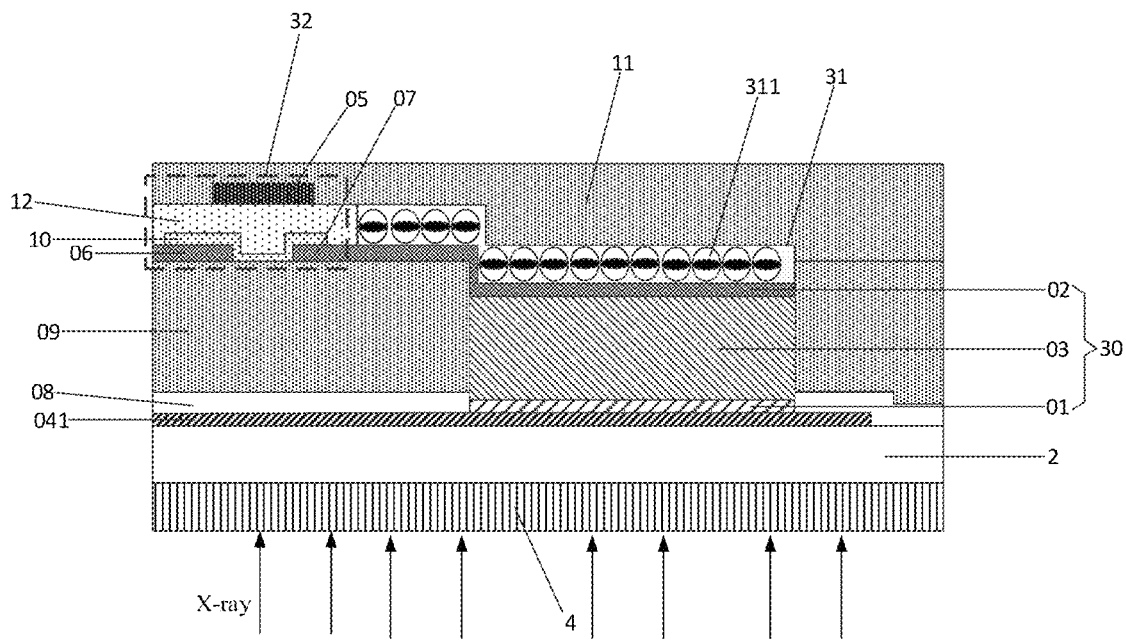
FIG. 3 is another schematic diagram of a detection panel provided in some embodiments of the present disclosure.

Further, in the detection panel provided by some embodiments of the present disclosure, as shown in FIG. 3, the photoelectric conversion structure 30 includes a first electrode 01, a photodiode 03 and a second electrode 02 which are sequentially stacked on the base substrate 2, wherein the second electrode 02 is electrically connected to the display structure 31. During operation, for example, the first electrode 01 is applied with a voltage of −5 to −10V, and the second electrode 02 is applied with a voltage of 1V, so that the photodiode 03 operates under a negative bias voltage; the photodiode 03 generates different current signals under different illuminations, and changing current signals cause the second electrode 02 to generate different voltage changes (minimum to −5 to −10V) to control the display structure 31 for display.

Further, in the detection panel provided by some embodiments of the present disclosure, the photodiode is a PIN photodiode. Optionally, the PIN photodiode includes a P-type region, an N-type region, and an intrinsic region which are sequentially stacked on the base substrate, wherein the intrinsic region is between the P-type region and the N-type region.

In a specific implementation, the material of the PIN photodiode is optionally a silicon-based material, and may also be a semiconductor material such as IGZO or graphite having a thickness of 800 nm to 1500 nm.

Further, in the detection panel provided by some embodiments of the present disclosure, as shown in FIG. 3, the display structure 31 includes a third electrode and an electronic ink layer 311 which are sequentially stacked on the photoelectric conversion structure 30; wherein the third electrode and the second electrode 02 are integrated. In this way, the second electrode 02 in the photoelectric conversion structure 30 is directly used as an electrode for controlling the display of the electronic ink layer 311, thereby simplifying the preparation process, saving production cost, and improving production efficiency.

Further, in the detection panel provided by some embodiments of the present disclosure, as shown in FIG. 3, the electronic ink layer 311 includes microcapsules in which black particles and white particles with opposite charge polarities are present. Optionally, a microcapsule is equivalent to a small ball, and the small ball contains liquid charges, wherein positive charges are white, and negative charges are black. That is, each small ball consists of two colors: black and white. The surfaces of the different color parts have different potentials. According to the principle that like charges repel, but opposite ones attract, as long as positive and negative charges are applied to one side of the small ball, the charges in the small ball can be concentrated in a segment, thereby displaying white or black. Optionally, the second electrode 02 is controlled to generate different voltage changes to control the rotation of the small ball and display black-and-white images.

Further, in order to improve the display effect, in the detection panel provided by some embodiments of the present disclosure, as shown in FIG. 3, an orthographic projection of the electronic ink layer 311 on the base substrate 2 at least partially covers an orthographic projection of the photoelectric conversion structure 30 on the base substrate 2.

Figure 4:
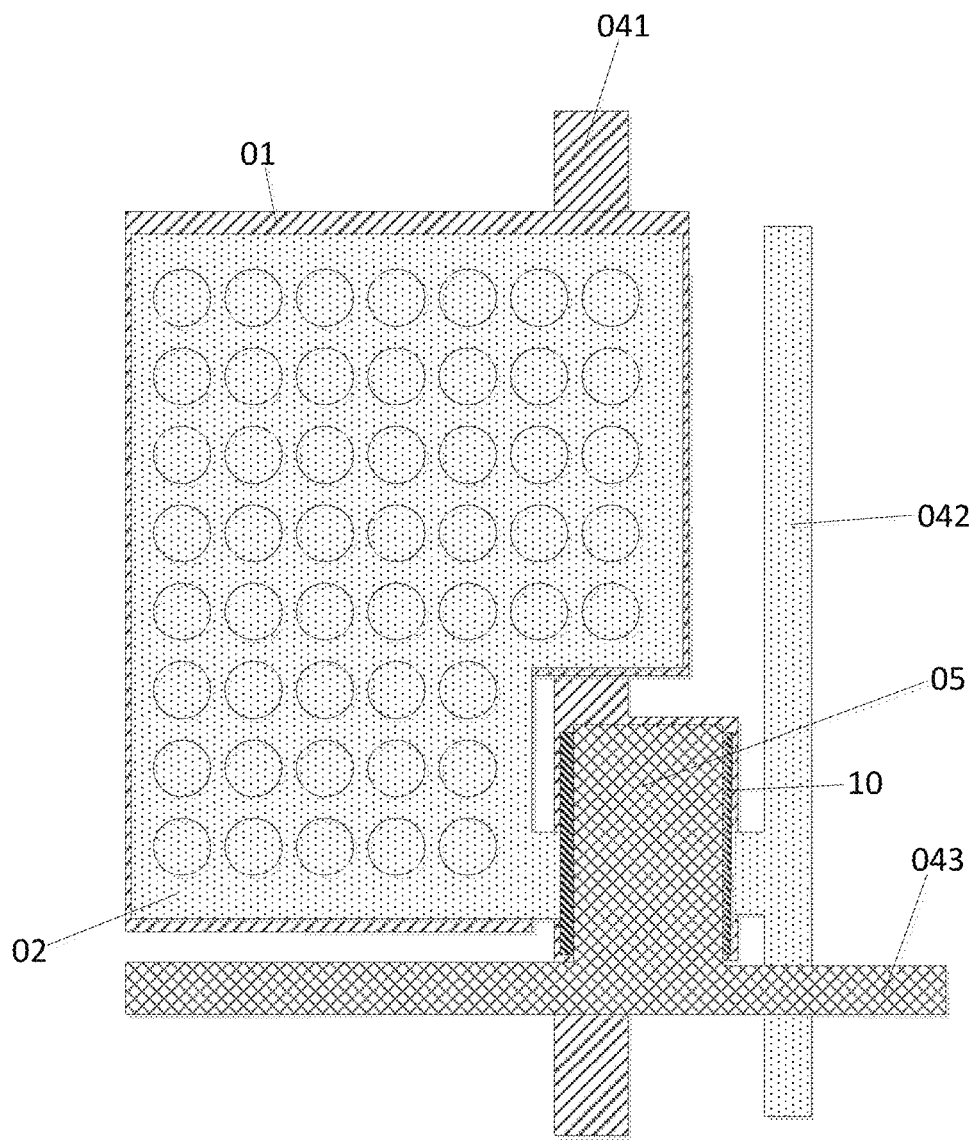
FIG. 4 is a top view of the detection panel as shown in FIG. 3.

Further, the detection panel provided by some embodiments of the present disclosure, as shown in FIG. 3 and FIG. 4 that is a top view of the detection panel shown in FIG. 3, further includes a thin film transistor 32, wherein the thin film transistor 32 includes a gate 05, an active layer 10, a source 06 and a drain 07, and the second electrode 02 and the drain 07 are integrated. In this way, the pattern of the second electrode 02 and the drain 07 can be formed by a patterning process, and the number of masks can be reduced compared with the detection panel in the related art shown in FIG. 1, thereby simplifying the preparation process, saving production cost, and improving production efficiency. In some embodiments of the present disclosure, a voltage signal generated on the second electrode 02 can be transmitted to an integrated circuit through the thin film transistor 32 to save image data.

Further, the detection panel provided by some embodiments of the present disclosure, as shown in FIG. 3, further includes a planarization layer 09 that is located between the first electrode 01 and the thin film transistor 32 and has a via hole, wherein the photodiode 03 is located in the via hole of the planarization layer 09, and the electronic ink layer 311 is partially located in the via hole of the planarization layer 09.

In order to illuminate the PIN photodiode, the first electrode 01 is a transparent electrode, but since the resistance value of the transparent electrode is large, an orthographic projection of the first electrode 01 on the base substrate completely overlaps with an orthographic projection of the PIN photodiode on the base substrate, so that a first electrode lead 041 needs to be arranged to connect the first electrode 01 to an integrated circuit to input a signal. Therefore, in specific implementation, the detection panel provided by some embodiments of the present disclosure, as shown in FIG. 3 and FIG. 4, further includes a first electrode lead 041 that connects the first electrode 01 to an integrated circuit. Due to radiation light such as X-rays that are incident on the detection panel, in order to prevent the radiation light from damaging the characteristics of the active layer 10, the first electrode lead 041 further includes a light shielding portion 001, wherein an orthographic projection of the light shielding portion 001 on the base substrate 2 covers an orthographic projection of the active layer 10 on the base substrate.

In specific implementation, the detection panel provided by some embodiments of the present disclosure, as shown FIG. 4, further includes a second electrode lead 042 that connects the second electrode 02 to an integrated circuit, wherein a gate 05 of the thin film transistor 32 is connected to a gate signal line 043, and a source 06 of the thin film transistor 32 is connected to the second electrode lead 042.

In specific implementation, the material of the gate 05 is optionally single-layer aluminium, and may also be a single-layer metal such as molybdenum, aluminum, tungsten, titanium, copper or an alloy or multilayer combination thereof having a thickness of 100 nm to 500 nm.

In specific implementation, the material of the first electrode lead is optionally single-layer aluminium, and may also be a single-layer metal such as molybdenum, aluminum, tungsten, titanium, copper or an alloy or multilayer combination thereof having a thickness of 100 nm to 500 nm. The first electrode 01 is optionally a transparent ITO, and may also be a transparent conductive material such as IZO having a thickness of 50 nm to 500 nm.

In specific implementation, the material of the second electrode 02 is optionally single-layer aluminium, and may also be a single-layer metal such as molybdenum, aluminum, tungsten, titanium, copper or an alloy or multilayer combination thereof having a thickness of 250 nm to 600 nm.

Further, in the detection panel provided by some embodiments of the present disclosure, the first electrode lead is disposed in the same layer as the first electrode, and/or the second electrode lead is disposed in the same layer as the second electrode.

In specific implementation, as shown in FIG. 3, the switching transistor 32 further includes an active layer 10 located on the source 06 and the drain 07 and electrically connected to the source 06 and the drain 07. The material of the active layer 10 is optionally amorphous silicon, and may also be a semiconductor material such as polysilicon or IGZO having a thickness of 100 nm to 300 nm.

In specific implementation, as shown in FIG. 3, the detection panel further includes a passivation layer 08 located between the first electrode 01 and the planarization layer 09. The material of the passivation layer 08 is optionally a resin material, and may also be an insulating material such as silicon nitride or chromic oxide, or a multilayer combination thereof having a thickness may be from 1000 nm to 3000 nm.

In specific implementation, the material of the planarization layer is optionally a resin material, and may also be an insulating material such as silicon nitride or chromic oxide, or a multilayer combination thereof having a thickness may be from 1000 nm to 3000 nm.

In specific implementation, as shown in FIG. 3, the detection panel further includes a protective layer 11 located on the switching transistor 32 and the electronic ink layer 31. The material of the protective layer 11 is optionally a resin material, and may also be an insulating material such as silicon nitride or chromic oxide, or a multilayer combination thereof having a thickness may be from 1000 nm to 3000 nm.

Further, the detection panel provided by some embodiments of the present disclosure, as shown in FIG. 3, further includes a scintillation layer 4 located on a side of the base substrate 2 facing away from the display structure (i.e., the electronic ink layer 31), wherein the scintillation layer 4 is configured to convert a radiation signal into an optical signal. The detection panel provided by the present disclosure can ensure that the electronic ink layer 31 does not occlude the incident light and improve the detection effect of the detection panel by arranging the electronic ink layer 31 and the scintillation layer 4 on both sides of the base substrate 2, respectively.

In specific implementation, the scintillation layer can be prepared by using any suitable scintillation material. In some embodiments, the scintillation material is a light wavelength converting material that converts radiation (e.g., X-rays) into visible light. Scintillation materials may include, but are not limited to, thallium-activated cesium iodide and sodium-activated cesium iodide, wherein cesium iodide is a light-sensitive material. Alternatively, the thickness of the scintillation layer may range from 400 μm to 1000 μm.

Figure 5:
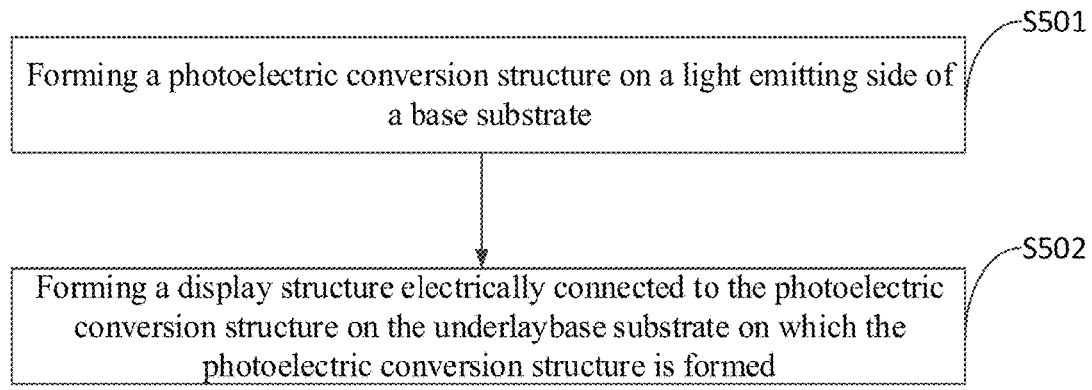
FIG. 5 is a flowchart of a manufacturing method of a detection panel provided in some embodiments of the present disclosure.

Based on the same inventive concept, some embodiments of the present disclosure further provide a manufacturing method of a detection panel, as shown in FIG. 5, including:

S501, forming a photoelectric conversion structure on an base substrate, wherein the photoelectric conversion structure is configured to convert an optical signal into an electrical signal;

S502, forming a display structure electrically connected to the photoelectric conversion structure on the base substrate on which the photoelectric conversion structure is formed, wherein the display structure is configured to perform image display according to the electrical signal.

Figure 6:
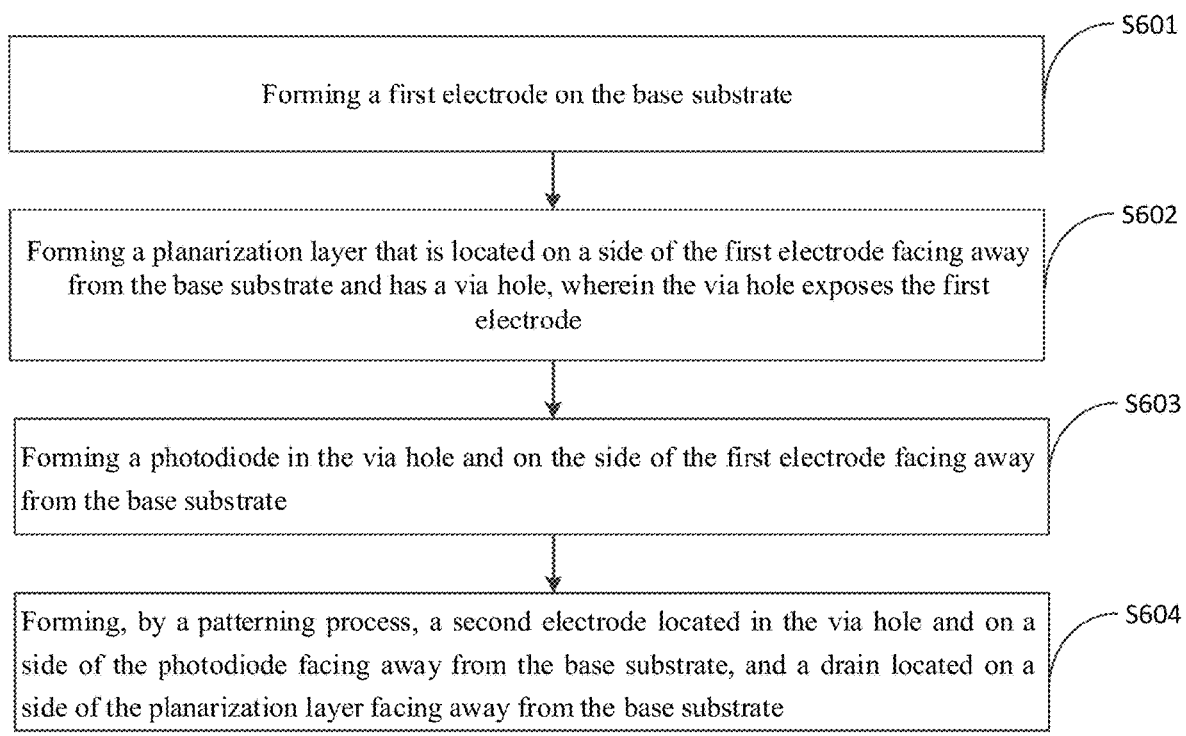
FIG. 6 is another flowchart of a manufacturing method of a detection panel provided in some embodiments of the present disclosure.

Further, in the manufacturing method of a detection panel provided by some embodiments of the present disclosure, as shown in FIG. 6, forming the photoelectric conversion structure includes:

S601, forming a first electrode on the base substrate;

S602, forming a planarization layer that is located on a side of the first electrode facing away from the base substrate and has a via hole, wherein the via hole exposes the first electrode;

S603, forming a photodiode in the via hole and on the side of the first electrode facing away from the base substrate; and S604, forming, by a patterning process, a second electrode located in the via hole and on a side of the photodiode facing away from the base substrate, and a drain located on a side of the planarization layer facing away from the base substrate.

Figure 7:
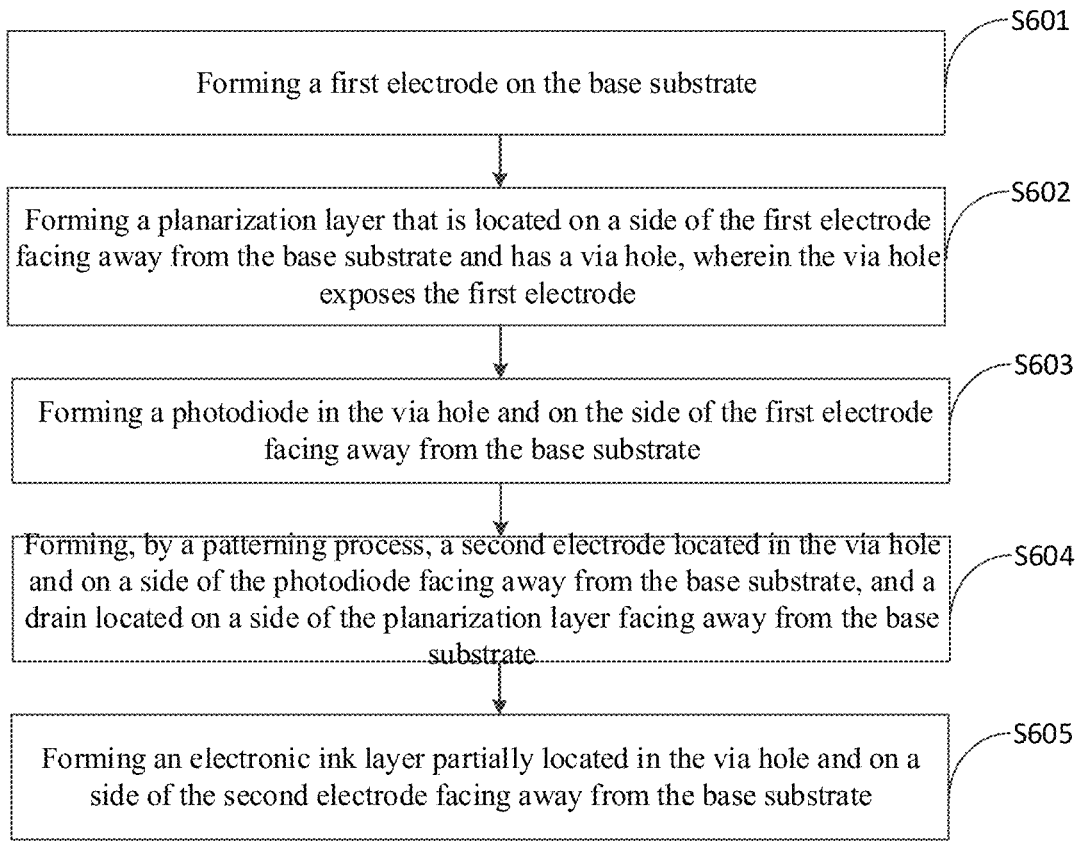
FIG. 7 is still another flowchart of a manufacturing method of a detection panel provided in some embodiments of the present disclosure.

Further, the manufacturing method of a detection panel provided by some embodiments of the present disclosure, as shown in FIG. 7, after forming the second electrode, further includes:

S605, forming an electronic ink layer partially located in the via hole and on a side of the second electrode facing away from the base substrate.

The manufacturing method of a detection panel as shown in FIG. 3 will be described in detail below through specific embodiments.

Figure 8A:
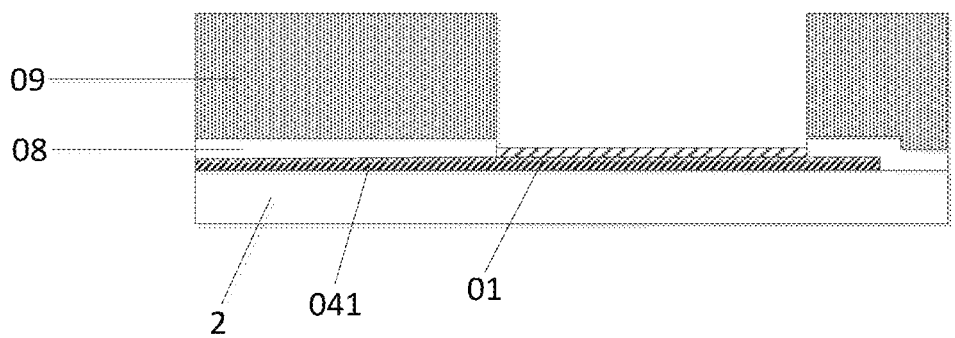
FIG. 8A is a section schematic diagram of the detection panel provided by some embodiments of the present disclosure after performing each step.
Figure 8B:
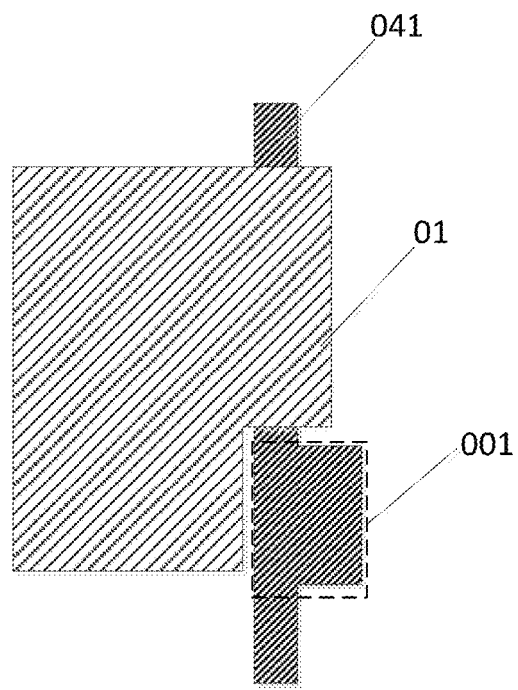
FIG. 8B is a top view of the first electrode lead and the first electrode as shown in FIG. 8A.

(1) A first electrode lead 041 is formed on the base substrate 2, the first electrode lead 041 includes a light shielding portion 001, and an orthographic projection of the light shielding portion 001 on the base substrate 2 covers an orthographic projection of the subsequently manufactured active layer 10 on the base substrate; a first electrode 01 is formed on the first electrode lead 041, a passivation layer 08 covering the base substrate 2 is formed on the first electrode 01, a planarization layer 09 is formed on the passivation layer 08, and a via hole is formed on the passivation layer 08 and the planarization layer 09 to expose the first electrode 01; as shown in FIG. 8A and FIG. 8B, FIG. 8B is a top view of the first electrode lead 041 and the first electrode 01 as shown in FIG. 8A.

Figure 9A:
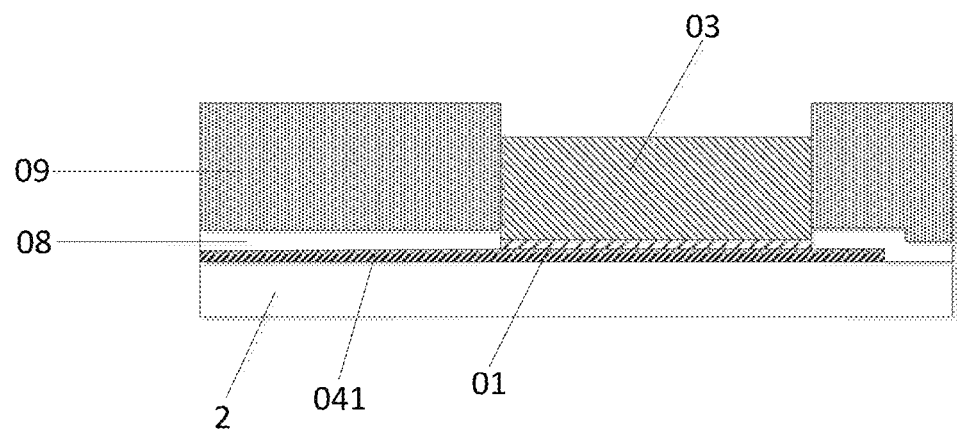
FIG. 9A is a section schematic diagram of the detection panel provided by some embodiments of the present disclosure after performing each step.
Figure 9B:
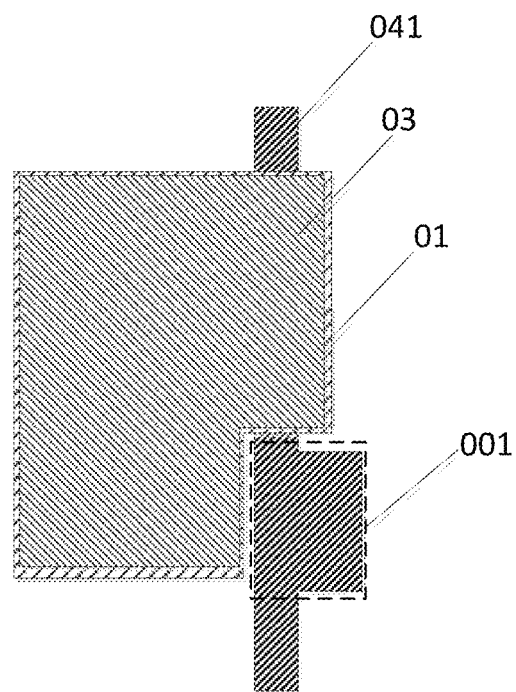
FIG. 9B is a top view of the PIN photodiode as shown in FIG. 9A.

(2) A photodiode 03 is formed on the base substrate 2 on which the first electrode 01 is formed, the photodiode 03 is located in the via hole of the planarization layer 09, and the photodiode 03 may be a PIN photodiode; as shown in FIG. 9A and FIG. 9B, FIG. 9B is a top view of the PIN photodiode as shown in FIG. 9A.

Figure 10A:
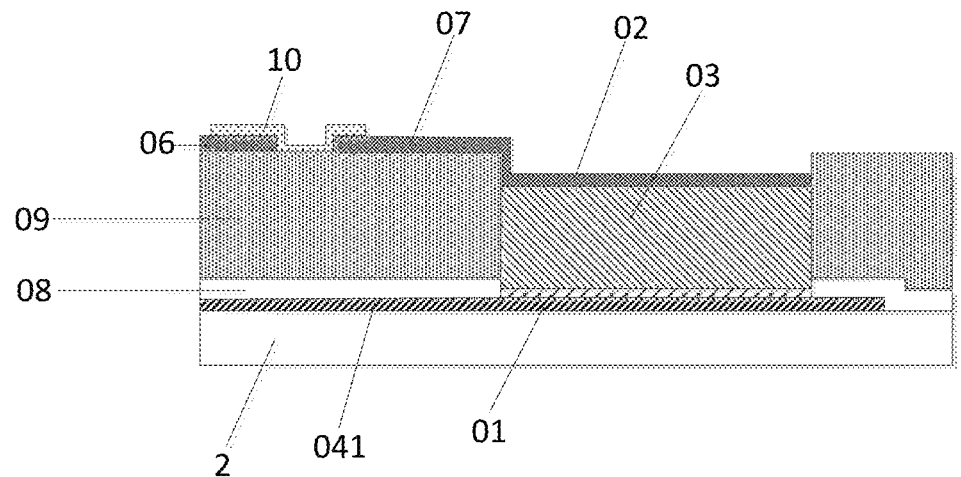
FIG. 10A is a section schematic diagram of the detection panel provided by some embodiments of the present disclosure after performing each step.
Figure 10B:
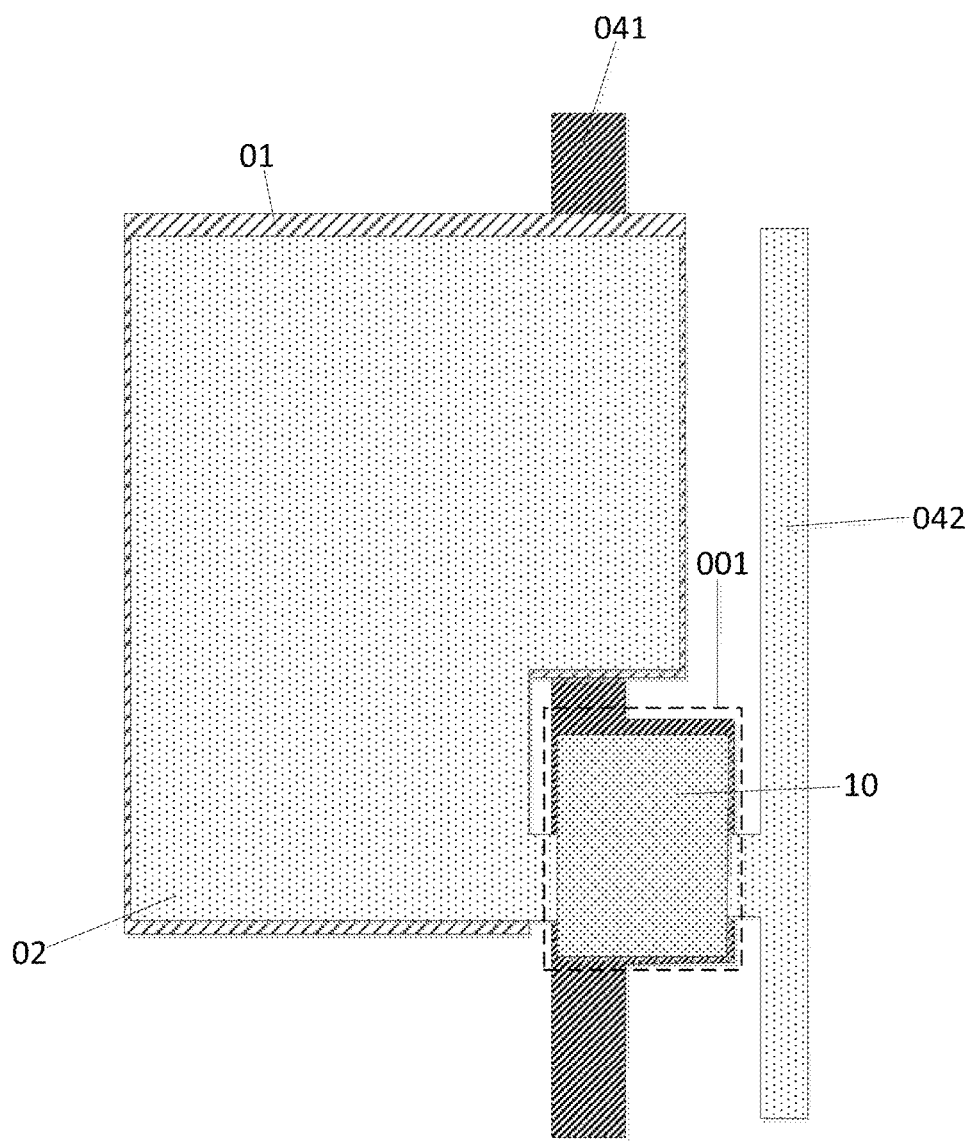
FIG. 10B is a top view of the second electrode and the active layer as shown in FIG. 10A.

(3) A second electrode 02, a source 06, and a drain 07 are formed on the base substrate 2 on which the photodiode 03 is formed; and by a patterning process, the second electrode 02 located in the via hole and on a side of the photodiode 03 facing away from the base substrate 2, and the drain 07 located on a side of the planarization layer 09 facing away from the base substrate 2 are formed, that is, the second electrode 02 and the drain 07 are integrated; an active layer 10 is further formed on the source 06 and the drain 07 and electrically connected to the source 06 and the drain 07, an orthographic projection of the light shielding portion 001 on the base substrate 2 covers an orthographic projection of the active layer 10 on the base substrate; as shown in FIG. 10A and FIG. 10B, FIG. 10B is a top view of the second electrode 02 and the active layer 10 as shown in FIG. 10A.

Figure 11A:
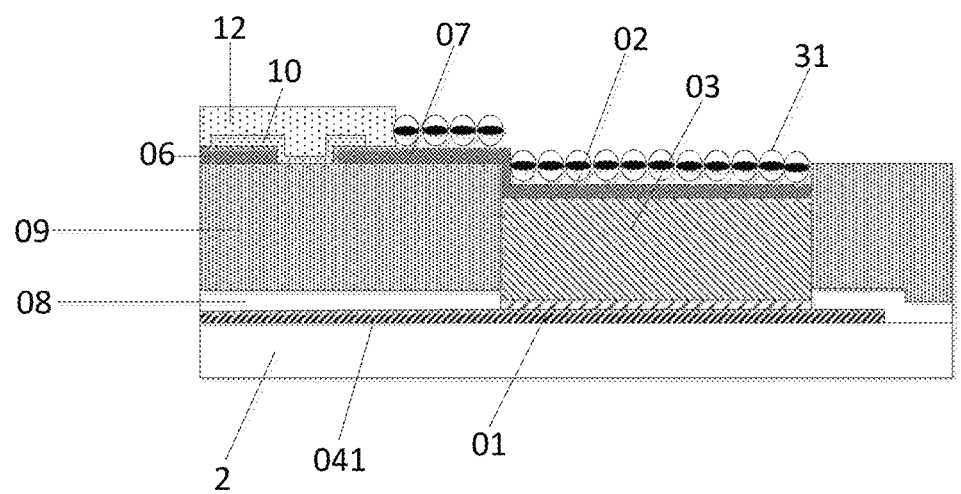
FIG. 11A is a section schematic diagram of the detection panel provided by some embodiments of the present disclosure after performing each step.
Figure 11B:
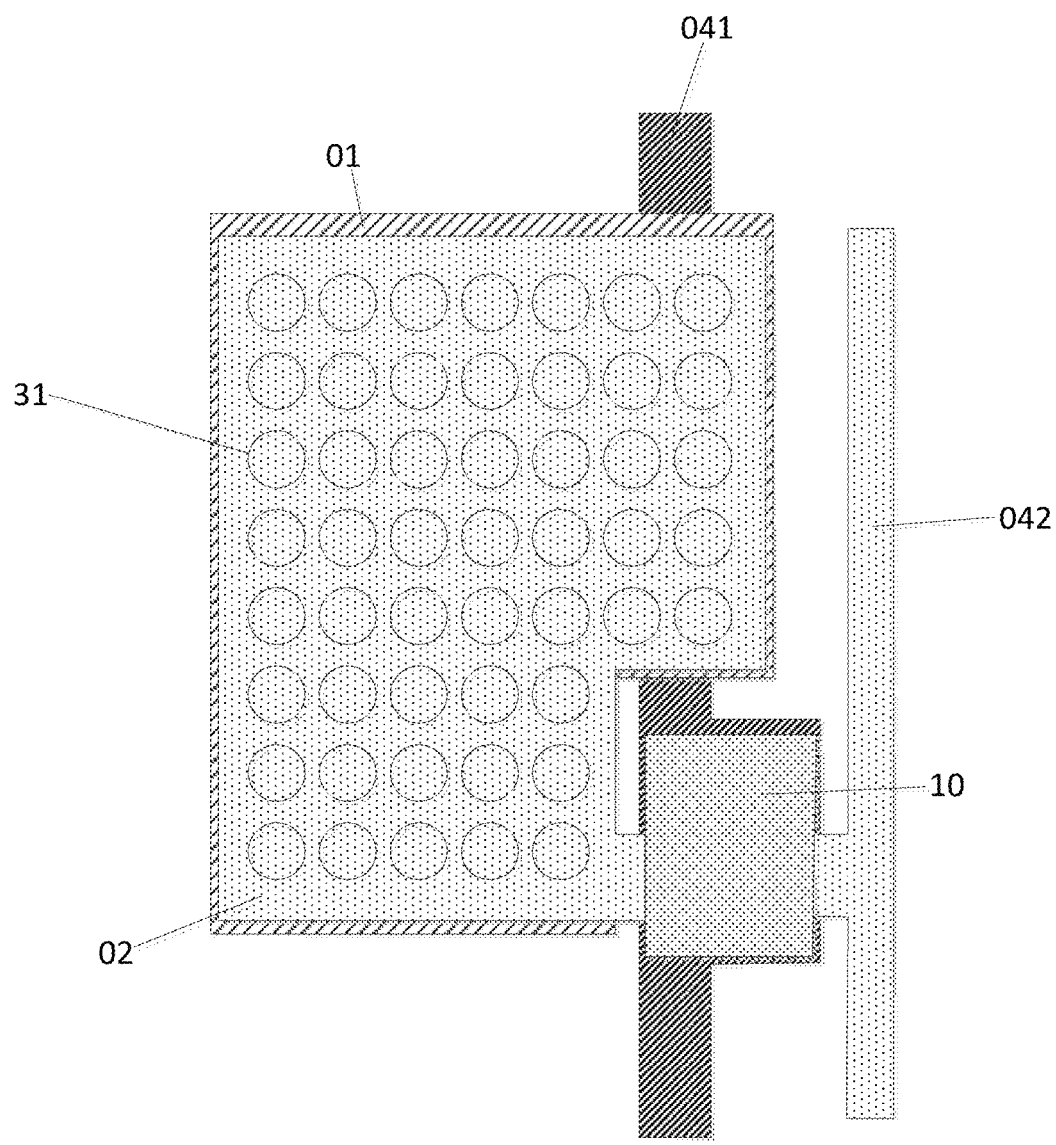
FIG. 11B is a top view of the electronic ink layer 311 as shown in FIG. 11A.

(4) A gate insulating layer 12 is formed on the base substrate 2 on which the active layer 10 is formed, and a via hole is formed in the gate insulating layer 12 to expose the drain electrode 07 and the second electrode 02, an electronic ink layer 311 is encapsulated on the exposed drain electrode 07 and the second electrode 02, and the electronic ink layer 311 is partially located in the via hole of the planarization layer 09. As shown in FIG. 11A and FIG. 11B, FIG. 11B is a top view of the electronic ink layer 311 as shown in FIG. 11A.

(5) A gate 05 is formed on the base substrate 2 on which the gate insulating layer 12 and the electron ink layer 311 are formed, and a protective layer 11 covering the base substrate 2 is formed above the gate 05; as shown in FIG. 3 and FIG. 4, FIG. 4 is a top view of the gate 05 as shown in FIG. 3.

The detection panel as shown in FIG. 3 provided by some embodiments of the present disclosure can be obtained by steps (1) to (5) of the above embodiments.

Based on the same inventive concept, some embodiments of the present disclosure further provide a detection device, including any detection panel provided by some embodiments of the present disclosure. The principle of the detection device to solve the problem is similar to that of the detection panel. Therefore, the implementation of the detection device can be referred to the implementation of the detection panel, and the repeated contents are not repeated herein.

Some embodiments of the present disclosure provide a detection panel, a manufacturing method thereof and a detection device. The detection panel includes: an base substrate and a photoelectric conversion structure located on the base substrate, and a display structure located on a side of the photoelectric conversion structure facing away from the base substrate and electrically connected to the photoelectric conversion structure; wherein the photoelectric conversion structure is configured to convert an optical signal into an electrical signal, and the display structure is configured to perform image display according to the electrical signal. In some embodiments of the present disclosure, the display structure electrically connected to the photoelectric conversion structure is disposed on the side of the photoelectric conversion structure facing away from the base substrate, and the direct display function of the detection panel is implemented by controlling the display structure, thus implementing the synchronous display function without requiring an external display device.

Obviously, a person skilled in the art can make various modifications and variations to the present disclosure without departing from the spirit and scope of the present disclosure. Thus, if these modifications and variations of the present disclosure fall within the scope of the claims of the present disclosure and the equivalent art, the present disclosure is also intended to include these modifications and variations.

The invention claimed is:

1. A detection panel, comprising: a base substrate and a photoelectric conversion structure located on the base substrate, and a display structure located on a side of the photoelectric conversion structure facing away from the base substrate and electrically connected to the photoelectric conversion structure; wherein the photoelectric conversion structure is configured to convert an optical signal into an electrical signal, and the display structure is configured to perform image display according to the electrical signal;
    wherein the detection panel further comprises a scintillation layer located on a side facing away from the display structure, of the base substrate.

2. The detection panel according to claim 1, wherein the photoelectric conversion structure comprises a first electrode, a photodiode and a second electrode which are sequentially stacked on the base substrate, and the second electrode is electrically connected to the display structure.

3. The detection panel according to claim 2, wherein the display structure comprises a third electrode and an electronic ink layer which are sequentially stacked on the photoelectric conversion structure; wherein the third electrode and the second electrode are integrated.

4. The detection panel according to claim 3, wherein an orthographic projection of the electronic ink layer on the base substrate at least partially covers an orthographic projection of the photoelectric conversion structure on the base substrate.

5. The detection panel according to claim 3, wherein the electronic ink layer comprises microcapsules in which black particles and white particles with opposite charge polarities are present.

6. The detection panel according to claim 5, further comprising a thin film transistor, wherein the thin film transistor comprises a gate, an active layer, a source and a drain, and the second electrode and the drain are integrated.

7. The detection panel according to claim 6, further comprising a planarization layer that is located between the first electrode and the thin film transistor and has a via hole, wherein the photodiode is located in the via hole of the planarization layer, and the electronic ink layer is partially located in the via hole of the planarization layer; the source, the gate, the active and the gate is sequentially disposed on a side of the planarization layer facing away from the base substrate.

8. The detection panel according to claim 6, further comprising a first electrode lead electrically connected to the first electrode, wherein the first electrode lead comprises a light shielding portion, and an orthographic projection of the light shielding portion on the base substrate covers an orthographic projection of the active layer on the base substrate.

9. The detection panel according to claim 6, further comprising a second electrode lead electrically connected to the second electrode to an integrated circuit, wherein a gate of the thin film transistor is connected to a gate signal line, and a source of the thin film transistor is connected to the second electrode lead.

10. A detection device, comprising the detection panel according to claim 1, further comprising a radiation emitting source located on a side of the scintillation layer facing away from the base substrate.

11. A manufacturing method of the detection panel according to claim 1, comprising:
    forming a photoelectric conversion structure on an base substrate, wherein the photoelectric conversion structure is configured to convert an optical signal into an electrical signal; and
    forming a display structure electrically connected to the photoelectric conversion structure on the base substrate on which the photoelectric conversion structure is formed, wherein the display structure is configured to perform image display according to the electrical signal.

12. The manufacturing method according to claim 11, wherein forming the photoelectric conversion structure comprises:
    forming a first electrode on the base substrate;
    forming a planarization layer that is located on a side of the first electrode facing away from the base substrate and has a via hole, wherein the via hole exposes the first electrode;
    forming a photodiode in the via hole and on the side of the first electrode facing away from the base substrate; and
    forming, by a patterning process, a second electrode located in the via hole and on a side of the photodiode facing away from the base substrate, and a drain located on a side of the planarization layer facing away from the base substrate.

13. The manufacturing method according to claim 12, after forming the second electrode, further comprising:

forming an electronic ink layer partially located in the via hole and on a side of the second electrode facing away from the base substrate.

\* \* \* \* \*